US005770304A

United States Patent [19]

Nakamura et al.

[11] Patent Number: 5,770,304

[45] Date of Patent: Jun. 23, 1998

[54] WIDE BANDWIDTH ELECTROMAGNETIC WAVE ABSORBING MATERIAL

[75] Inventors: Koji Nakamura, Amagasaki; Hideki Komori, Takatsuki; Mitsuyuki Oda, Kyoto; Kazunori Kanda, Yao, all of Japan

[73] Assignee: Nippon Paint Co., Ltd., Osaka-fu, Japan

[21] Appl. No.: 500,836

[22] Filed: Jul. 11, 1995

[30] Foreign Application Priority Data

Jul. 11, 1994 [JP] Japan .................................... 6-158398

[51] Int. Cl.[6] ....................................................... B32B 5/16

[52] U.S. Cl. .......................... 428/328; 428/329; 428/330; 428/331; 428/332; 428/900

[58] Field of Search .................................... 428/323, 328, 428/329, 330, 331, 332, 354, 900

[56] References Cited

U.S. PATENT DOCUMENTS

| | | | |
|---|---|---|---|
| 3,680,107 | 7/1972 | Meinke et al. | 343/18 A |
| 3,737,903 | 6/1973 | Suetake et al. | 343/18 A |
| 4,012,738 | 3/1977 | Wright | 343/18 A |
| 4,023,174 | 5/1977 | Wright | 343/18 A |
| 4,414,339 | 11/1983 | Solc et al. | 523/137 |
| 4,538,151 | 8/1985 | Hatakeyama et al. | 343/18 A |
| 4,690,778 | 9/1987 | Narumiya et al | 252/506 |
| 5,179,381 | 1/1993 | Hatakeyama | 342/1 |
| 5,258,596 | 11/1993 | Fabish et al. | 219/10.55 F |
| 5,296,859 | 3/1994 | Naito et al. | 342/1 |
| 5,323,160 | 6/1994 | Kim et al. | 342/1 |

OTHER PUBLICATIONS

Berthault et al., "Magnetic Properties Of Permalloy Microparticles", *Journal of Magnetism and Magnetic Materials,* vol. 112, No. 1/3, Jul. 1, 1992 Amsterdam NL, pp. 477–480.

*Primary Examiner*—H. Thi Le
*Attorney, Agent, or Firm*—Wenderoth, Lind & Ponack

[57] ABSTRACT

The present invention provides a thin wide bandwidth electromagnetic wave absorbing material capable of absorbing electromagnetic waves in both the semi-microwave band and the semi-millimeter and millimeter wave band. The present electromagnetic wave absorbing material comprises: a first layer composed of a conductive material; a second layer comprising a particle of a metal oxide magnetic material and a matrix of a binder, being applied on the first layer; and a third layer comprising a particle of a metal magnetic material and a matrix of a binder, being applied on the second layer.

10 Claims, No Drawings

WIDE BANDWIDTH ELECTROMAGNETIC WAVE ABSORBING MATERIAL

FIELD OF THE INVENTION

The present invention relates to an electromagnetic wave absorbing material, more particularly to a wide bandwidth electromagnetic wave absorbing material for absorbing an electromagnetic wave of from semi-microwave band to millimeter wave band.

BACKGROUND OF THE INVENTION

The technical innovation toward advanced information-oriented society is steadily progressing. The information and communication technology is making a dramatic advancement, and investment in a communication infrastructure is highly expected as a next big market, together with a personal information appliance and its system represented by multimedia.

Semi-microwave band in 1.9 GHz band and 2.45 GHz band, semi-millimeter wave band in 19 GHz band and millimeter wave band in 60 GHz band will practically be used in communication systems. In foreign countries, 900 MHz band and 5.7 GHz band are also presented for practical use for radio LAN.

The semi-microwave band is assigned for a personal handy-phone system (PHS) and an indoor radio appliance of medium speed radio LAN, and the semi-millimeter and millimeter wave band are assigned for an indoor radio appliance of high speed radio LAN. As the demand expands in each frequency band, mutual interference of electromagnetic waves, crosstalk due to delayed dispersion, malfunction, tapping and other problems are feared.

As an electromagnetic wave absorbing material, a sheet material prepared from a resin composition of ferrite is known. The electromagnetic wave absorbing material may provide sufficient absorptivity at a desired frequency, by controlling the magnetic characteristic and dielectric characteristic of the composition, and by controlling its thickness precisely.

In such techniques, however, it is impossible to absorb in vastly separate. frequency bands of the semi-microwave band and the semi-millimeter and millimeter wave band at the same time. Thus, as the use of the semi-microwave band and the semi-millimeter and millimeter wave band increases, a need for the electromagnetic wave absorbing material which can absorb in both semi-microwave band and semi-millimeter wave band equally, exists in the related art.

SUMMARY OF THE INVENTION

The present invention provides a thin wide bandwidth electromagnetic wave absorbing material capable of absorbing electromagnetic waves in both the semi-microwave band and the semi-millimeter and millimeter wave band.

The present invention provides an electromagnetic wave absorbing material comprising: a first layer composed of a conductive material; a second layer comprising a particle of a metal oxide magnetic material and a matrix of a binder, being applied on the first layer; and a third layer comprising a particle of a metal magnetic material and a matrix of a binder, being applied on the second layer.

DETAILED DESCRIPTION OF THE INVENTION

In an electromagnetic wave absorbing material of the present invention, the second layer and the third layer should be formed on the first layer in this order. If the order is reversed, absorptivity for electromagnetic waves of the resulting electromagnetic wave absorbing material becomes poor.

The first layer of the electromagnetic wave absorbing material is composed of a conductive material. The conductive material is not particularly limited as far as it has a shielding capacity of not less than 20 dB, preferably not less than 30 dB. The conductive material may also function as a support. More specifically, a plate, a plated plate, a mesh, a cloth of metals such as copper, aluminum, steel, iron, nickel, stainless steel and brass may be used. The metal material may be surface treated or primed for enhancing the interlayer adhesion, and an example of which is precoated steel plate.

A conductive coated film comprising a particle of the conductive material and a binder, and a liquid phase or a vapor phase plated layer of the conductive material may be also used as the first layer. For example, a metallized material which has a conductive layer placed on a nonconductive substrate such as a plastic substrate may be also used in the present invention. The conductive layer may be a conductive coated film, or it may be an electroless plated layer of copper or Ni, or a deposited layer of aluminum, or the like.

The second layer is composed of a particle of a metal oxide magnetic material and a matrix of a binder. In the present invention, the “metal oxide magnetic material” refers to a magnetic material mainly composed of metal oxide (for example, iron oxide), and is used as a term distinguished from the “metal magnetic material” mentioned below. Specific examples thereof include Mn-Zn ferrite, Ni-Zn ferrite, Mn-Mg-Zn ferrite, Li ferrite, Mn-Cu-Zn ferrite, Ba ferrite, and Sr ferrite. The mean particle size is preferably 1 to 50 $\mu$m, more preferably 2 to 3 $\mu$m.

Preferred examples of the metal oxide magnetic material are Mn-Zn ferrite, Ni-Zn ferrite, and Mn-Mg-Zn ferrite. Particularly preferred is Mn-Zn ferrite having a particle size of 5 to 20 $\mu$m. These particulate materials may optionally be surface treated with silane coupling agent or titanium derivative coupling agent for the purpose of improving physical property or producing ability.

As the binder, a thermoplastic and a thermosetting organic high molecular material, and an inorganic ceramic material such as cement, calcium silicate and gypsum can be used. The binder preferably used in the present invention is an organic high molecular material including epoxy resin, polyvinyl chloride, ethylene-vinyl acetate copolymer, ethylene-vinyl acetate block copolymer, copolymer or block copolymer of ethylene and (meth)acrylate, chlorinated polyethylene, acrylic resin, fluorine containing polymer, polyamide, polyester, silicone resin, polyurethane resin, synthetic rubber and phosphagen resin. Specific examples of the inorganic ceramic material include calcium sulfate, calcium silicate, water glass, Portland cement, alumina cement, alkyl silicate, calcium oxide and clay.

Preferred examples of the binder include epoxy resin, ethylene-vinyl acetate copolymer, ethylene-vinyl acetate block copolymer, ethylene-acrylate block copolymer, and 1,2-nylon.

When the organic high molecular material is used as a binder, the layer may be formed by a conventional method such as extrusion molding and pressure molding, or by thick coating a properly diluted solution thereof. When the inorganic ceramic material is used as a binder, the layers may be formed by a method for paper making, extrusion molding or the like.

The metal oxide magnetic material is included in the second layer in an amount of 85 to 92% by weight, preferably 90% by weight. When the amount is more than 92% by weight, although electromagnetic wave absorptivity of the electromagnetic wave absorbing material becomes excellent, rigidity, weight and durability become poor, and the resulting material has little practical use. If lower than 85% by weight, the electromagnetic wave absorptivity becomes poor.

The third layer is composed of a particle of a metal magnetic material and a matrix of a binder. The "metal magnetic material" refers to a material of magnetic metals and their alloys. Examples of the magnetic metal include Fe, Ni and Co. Examples of the magnetic metal alloy include silicon steel, Sendust, Permalloy, amorphous metal, and iron magnetic alloy containing at least one metal element selected from the group consisting of Si, Al, Co, Ni, V, Sn, Zn, Pb, Mn, Mo, and Ag.

The mean particle size of the metal magnetic material is not particularly limited as far as it can be uniformly mixed with the binder, and is preferably 1 to 30 $\mu$m, more preferably 2 to 20 $\mu$m. Specific components thereof include Fe powder of high purity, particularly carbonyl iron powder, and magnetic alloy powder which contains not less than 80% by weight of iron produced by atomizing method. These particulate materials may be surface treated with silane coupling agent or titanium derivative coupling agent as described above.

The metal magnetic material is included in the third layer in an amount of 80 to 90% by weight, preferably 85 to 90% by weight. When the amount is more than 90% by weight, although electromagnetic wave absorptivity of the electromagnetic wave absorbing material becomes excellent, rigidity, weight and durability become poor, and the resulting material has little practical use. If lower than 80% by weight, the electromagnetic wave absorptivity becomes poor.

The binder employed in the third layer may be the same as in the second layer. The layer may be formed in the same manner as the second layer. When forming the second layer and third layer, in order to improve layer forming ability, coating ability and electromagnetic wave absorptivity, conventional additives such as plasticizer, viscosity controlling agent, surface active agent, flame retardant, lubricant, deforming agent, thermal stabilizer and antioxidant may optionally be used. For example, the flame retardant is indispensable for producing a building material having wide bandwidth electromagnetic wave absorptivity.

In order to provide a practical electromagnetic wave absorbing material having an absorptivity of more than 75% over the bandwidth of from semi-microwave to millimeter wave, the second layer must be formed in a thickness of 1.8 to 3.6 mm, in particular, 2.2 to 3.2 mm, and the third layer, 0.2 to 1.1 mm, in particular, 0.3 to 0.8 mm.

When the thickness of the second layer is less than 1.8 mm, absorptivity for the semi-microwave band becomes poor. If the thickness is more than 3.6 mm, the material becomes thick, expensive and heavy, and it has little practical use. When the thickness of the third layer is less than 0.2 mm or more than 1.2 mm, absorptivity for the bandwidth of from semi-millimeter wave to millimeter wave becomes poor. Incidentally, to provide a light and thin electromagnetic wave absorbing material, the total thickness of the second layer and the third layer is preferred to be not more than 4 mm.

To protect a surface of the electromagnetic wave absorbing material, a fourth layer composed of a polymeric material such as polycarbonate and acrylic resin may be provided on the third layer. A surface of the electromagnetic wave absorbing material may temporarily be protected by employing a plastic film or a plastic paint as the fourth layer. A surface of the fourth layer may be decorated by printed pattern, two-dimensional pattern, embossed pattern and three-dimensional pattern. For fireproof property or silencing property, an inorganic board may be employed as the fourth layer to provide a composite material.

The wide bandwidth electromagnetic wave absorbing material obtained in the present invention may be combined with heat insulating, sound insulating, heatproofing, rust preventing, waterproofing or decorating materials to provide a building material for interior or exterior wall decoration having extremely high commercial value.

Examples of materials to be combined with the wide bandwidth electromagnetic wave absorbing material of the present invention include organic and inorganic building materials generally used in the building art. Besides, by controlling a thickness of the second layer and the third layer, the present electromagnetic wave absorbing material selectively absorbs an electromagnetic wave of specific frequency. The present electromagnetic wave absorbing material is thus very useful for constructing the communication infrastructure.

According to the concept of the distribution constant circuit, the absorption amount increases when the field impedance of the outermost surface of the absorber is closer to the characteristic impedance of the space. The field impedance of the outermost surface of the absorber is determined by the electromagnetic characteristic and thickness of the layer which constructs the absorber, and by the frequency of the electromagnetic wave. The present invention discloses a method for bringing the field impedance closer to the characteristic impedance of the space in two vastly apart frequency bands of the semi-microwave band and the semi-millimeter and millimeter wave band.

EXAMPLES

The following Examples and Comparative Examples further illustrate the present invention in detail but are not to be construed to limit the scope thereof. In the examples, the mean particle size is measured by means of a microtrack.

Example 1

Ferrite particles with mean particle size of 15 $\mu$m comprising MnO, ZnO, and $Fe_2O_3$ in an molar ratio of 32:14:54 were dispersed in a two-part curing type epoxy resin (Main agent: "Epichlon 830" of Dainippon Ink Chemical Industrial Co., Ltd.; Hardener: "Epomate LX-2S" of Yuka Shell Epoxy Co., Ltd.) in an amount of 90% by weight based on solid matter of the resulting dispersion. A 1 mm thick copper plate was coated with the obtained dispersion in a thickness of 2.5 mm to form a second layer.

Carbonyl iron with mean particle size of 3.5 $\mu$m (HL grade, made by BASF) was dispersed in the same two-part curing type epoxy resin in an amount of 85% by weight based on solid matter of the resulting dispersion. The obtained dispersion was applied on the second layer in a thickness of 0.5 mm to form a third layer, and an electromagnetic wave absorbing material was obtained.

Example 2

Ferrite particles with mean particle size of 13 $\mu$m comprising MnO, ZnO, and $Fe_2O_3$ at molar ratio of 30:15:55 were kneaded in an ethylene-vinyl acetate copolymer ("P-1907" of Mitsui-DuPont Chemical Co., Ltd.) in an amount of 90% by weight based on solid matter of the resulting dispersion. The resulting dispersion was hot pressed to form a sheet 2.3 mm thick. On one side of this sheet, an aluminum foil about 50 μm thick was tightly fitted to obtain a laminate of a first layer and a second layer.

Iron powder with mean particle size of about 4 μm ("Sicopur FF4068" of BASF) was kneaded in the same ethylene-vinyl acetate copolymer in an amount of 88% by weight based on solid matter of the resulting dispersion. The resulting dispersion was hot pressed to form a sheet 0.7 mm thick. The sheet was put on the second layer, and pressed into one body by the hot press again, and an electromagnetic wave absorbing material was obtained.

Example 3

The ferrite particles of Example 1 were classified, and ferrite particles with mean particle size of 30 μm were obtained. An electromagnetic wave absorbing material was obtained in the same manner as in Example 1, except that they were dispersed in an amount of 92% by weight based on solid matter of the resulting dispersion.

Example 4

The ferrite particles of Example 1 were classified, and ferrite particles with mean particle size of about 5 μm were obtained. An electromagnetic wave absorbing material was obtained in the same manner as in Example 1, except that they were dispersed in an amount of 85% by weight based on solid matter of the resulting dispersion.

Example 5

The carbonyl iron particles of Example 1 were classified, and carbonyl iron particles with mean particle size of about 2 μm were obtained. An electromagnetic wave absorbing material was obtained in the same manner as in Example 1, except that it was dispersed in an amount of 88% by weight based on solid matter of the resulting dispersion.

Example 6

The carbonyl iron particles of Example 1 were classified, and carbonyl iron particles with mean particle size of about 5 μm were obtained. An electromagnetic wave absorbing material was obtained in the same manner as in Example 1, except that it was dispersed in an amount of 80% by weight based on solid matter.

Example 7

An electromagnetic wave absorbing material was obtained in the same manner as in Example 1 except that the second layer was formed in 1.8 mm thickness and the third layer was formed in 1.1 mm thickness.

Example 8

An electromagnetic wave absorbing material was obtained in the same manner as in Example 1 except that the second layer was formed in 3.6 mm thickness and the third layer was formed in 0.4 mm thickness.

Example 9

To a dry-type acrylic resin ("IB6500" of Mitsui Toatsu Chemical Co., Ltd.), Cu-Ag conductive particles were dispersed. The resulting conductive paint was applied on an asbestos-cement pearlite plate (JIS A 5413) in a thickness of about 0.2 mm.

After the conductive paint is dried, a second layer and a third layer were sequentially formed in the same manner as in Example 1, and an electromagnetic wave absorbing material was obtained.

Example 10

An electromagnetic wave absorbing material was obtained in the same manner as in Example 1 except that the second layer was formed in 2.7 mm thickness and the third layer was formed in 0.2 mm thickness.

Example 11

An electromagnetic wave absorbing material was obtained in the same manner as in Example 1 except that the second layer was formed in 2.2 mm thickness and the third layer was formed in 0.4 mm thickness.

Example 12

An electromagnetic wave absorbing material was obtained in the same manner as in Example 1 except that the second layer was formed in 3.2 mm thickness and the third layer was formed in 0.8 mm thickness.

Example 13

An electromagnetic wave absorbing material was obtained in the same manner as in Example 1 except that the second layer was formed in 2.2 mm thickness and the third layer was formed in 0.8 mm thickness.

Example 14

An electromagnetic wave absorbing material was obtained in the same manner as in Example 1 except that the second layer was formed in 3.2 mm thickness and the third layer was formed in 0.4 mm thickness.

Comparative Example 1

An electromagnetic wave absorbing material was obtained in the same manner as in Example 1, except that a 2 mm thick acrylic plate was used instead of the copper plate.

Comparative Example 2

An electromagnetic wave absorbing material was obtained in the same manner as in Example 1, except the second layer was formed in 3 mm thickness, and the third layer was not provided.

Comparative Example 3

An electromagnetic wave absorbing material was obtained in the same manner as in Example 1, except that the second layer was not provided, and the third layer was formed in 3 mm thickness.

Comparative Example 4

An electromagnetic wave absorbing material was obtained in the same manner as in Example 1, except that the third layer was provided on the copper plate, the second layer was then provided thereon.

Comparative Example 5

The ferrite particles and the carbonyl iron particles used in Example 1 were mixed at a rate by weight of 1:1, and this was dispersed in the epoxy resin employed in Example 1 in an amount of 90% by weight based on solid matter of the resulting dispersion. The resulting dispersion was applied on a 1 mm thick copper plate in a thickness of 3 mm, and an electromagnetic wave absorbing material was obtained.

Evaluation of the Electromagnetic Wave Absorption Materials

The electromagnetic materials obtained in Examples 1 to 14 and Comparative Examples 1 to 5 were processed in order to TEM injects at the laminated side, and were then placed into 7 mm hollow coaxial tubes. An amount of reflection attenuation was measured by using a network analyzer.

The composition of the materials are shown in Table 1, and results of measurement are shown in Table 2.

TABLE 2-continued

| | Absorptivity (%) | | |
|---|---|---|---|
| Example No. | 1.9 GHz | 2.45 GHz | 19 GHz |
| Comp. Ex. 4 | 88 | 90 | 60 |
| Comp. Ex. 5 | 75 | 88 | 70 |

Example 15

To the ferrite particles used in Example 1, silane coupling agent having an epoxy group ("A187" of Nippon Unicar K.K.) was added in an amount of 0.5% by weight based on the ferrite, and mixed sufficiently. A binder composition was obtained by combining 100 parts of vinyl chloride resin ("Zeon 121" of Nippon Zeon Co., Ltd.), 30 parts of dioctyl phthalate (DOP), and a suitable amount of stabilizer.

TABLE 1

| | | Second layer | | | | Third layer | | | | Total |
|---|---|---|---|---|---|---|---|---|---|---|
| Ex. No. | First layer | MM*1 | PS*2 (μm) | Cont.*3 (%) | Thick.*4 (mm) | MM | PS (μm) | Cont. (%) | Thick. (mm) | thick. (mm) |
| 1 | Copper plate | Mn—Zn*5 | 15 | 90 | 2.5 | FeCO*6 | 3.5 | 85 | 0.5 | 3.0 |
| 2 | Aluminium foil | Fe rich | 13 | EV90 | 2.3 | Fe powd. | 4.0 | 88 | 0.7 | 3.0 |
| 3 | Copper plate | Mn—Zn | 30 | 92 | 2.5 | FeCO | 3.5 | 85 | 0.5 | 3.0 |
| 4 | Copper plate | Mn—Zn | 5 | 85 | 2.5 | FeCO | 3.5 | 85 | 0.5 | 3.0 |
| 5 | Copper plate | Mn—Zn | 15 | 90 | 2.5 | FeCO | 2.0 | 88 | 0.5 | 3.0 |
| 6 | Copper plate | Mn—Zn | 15 | 90 | 2.5 | FeCO | 5.0 | 80 | 0.5 | 3.0 |
| 7 | Copper plate | Mn—Zn | 15 | 90 | 1.8 | FeCO | 3.5 | 85 | 1.1 | 2.9 |
| 8 | Copper plate | Mn—Zn | 15 | 90 | 3.6 | FeCO | 3.5 | 85 | 0.4 | 4.0 |
| 9 | Conductive paint | Mn—Zn | 15 | 90 | 2.5 | FeCO | 3.5 | 85 | 0.5 | 3.0 |
| 10 | Copper plate | Mn—Zn | 15 | 90 | 2.7 | FeCO | 3.5 | 85 | 0.2 | 2.9 |
| 11 | Copper plate | Mn—Zn | 15 | 90 | 2.2 | FeCO | 3.5 | 85 | 0.4 | 2.6 |
| 12 | Copper plate | Mn—Zn | 15 | 90 | 3.2 | FeCO | 3.5 | 85 | 0.8 | 4.0 |
| 13 | Copper plate | Mn—Zn | 15 | 90 | 2.2 | FeCO | 3.5 | 85 | 0.8 | 3.0 |
| 14 | Copper plate | Mn—Zn | 15 | 90 | 3.2 | FeCO | 3.5 | 85 | 0.4 | 3.6 |
| C1 | Acryl plate | Mn—Zn | 15 | 90 | 2.5 | FeCO | 3.5 | 85 | 0.5 | 3.0 |
| C2 | Copper plate | Mn—Zn | 15 | 90 | 3.0 | — | — | — | — | 3.0 |
| C3 | Copper plate | — | — | — | — | FeCO | 3.5 | 85 | 3.0 | 3.0 |
| C4 | Copper plate | FeCO | 3.5 | 85 | 0.5 | Mn—Zn | 1.5 | 90 | 2.5 | 3.0 |
| C5 | Copper plate | 1:1 mix | — | 90 | 3.0 | — | — | — | — | — |

*1 Magnetic material
*2 Particle size
*3 Content of the magnetic material
*4 Thickness
*5 Mn—Zn ferrite
*6 Carbonyl iron

TABLE 2

| | Absorptivity (%) | | |
|---|---|---|---|
| Example No. | 1.9 GHz | 2.45 GHz | 19 GHz |
| 1 | 82 | 86 | 87 |
| 2 | 80 | 86 | 85 |
| 3 | 91 | 83 | 82 |
| 4 | 77 | 82 | 83 |
| 5 | 80 | 84 | 80 |
| 6 | 84 | 87 | 85 |
| 7 | 76 | 84 | 75 |
| 8 | 93 | 89 | 78 |
| 9 | 82 | 86 | 87 |
| 10 | 83 | 86 | 77 |
| 11 | 75 | 81 | 79 |
| 12 | 93 | 91 | 75 |
| 13 | 80 | 86 | 83 |
| 14 | 90 | 90 | 81 |
| Comp. Ex. 1 | 41 | 44 | 48 |
| Comp. Ex. 2 | 84 | 80 | 72 |
| Comp. Ex. 3 | 65 | 86 | 72 |

To the ferrite particles treated with silane coupling agent, the binder composition was added and kneaded, and a ferrite dispersant of 87% by weight of solid content was obtained. This ferrite dispersant was hot pressed to provide a sheet 2.5 mm thick. An aluminum foil about 50 μm thick was fitted tightly to provide a laminate of a first layer and a second layer.

Silicon steel powder with mean particle size of about 10 μm (Fe:Si=94:6) was treated with silane coupling agent as described above, and mixed with the binder composition in an amount of 82% by weight based on solid matter of the resulting dispersion. The dispersion was molded to provide a sheet 0.5 mm thick.

This sheet was put on the laminate of the first and second layers, and hot pressed to obtain an electromagnetic wave absorbing material.

Example 16

An electromagnetic wave absorbing material was obtained in the same manner as in Example 15, except that silane coupling agent ("Prenact KR TTS" of Ajinomoto Co., Inc.) was added to the ferrite particles obtained in Example 1 in an amount of 1.0% by weight, and that an ethylene-vinyl acetate block copolymer ("Sumigraft GFL" of SUMITOMO CHEMICAL CO., LTD.) was used instead of the binder composition composed of vinyl chloride resin, plasticizer and stabilizer.

Example 17

An electromagnetic wave absorbing material was obtained in the same manner as in Example 15, except that silicon aluminum steel powder with mean particle size of about 15 μm (Fe:Si:Al=84:10:6) was used instead of silicon steel powder.

Evaluation of the Electromagnetic Wave Absorption Materials

The electromagnetic materials obtained in Examples 15 to 17 were processed in order to TEM injects at the laminated side, and were then placed into 7 mm hollow coaxial tubes. An amount of reflection attenuation was measured against to electromagnetic waves having wavelength of 1.9 GHz, 2.4 GHz, 5.8 GHz and 19 GHz respectively, by using a network analyzer.

An amount of reflection attenuation of the electromagnetic wave absorbing materials of Example 1 and Comparisons 2 and 3 were also measured according to the same manner. The results are shown in Table 3.

TABLE 3

| | Absorptivity (%) | | | | |
|---|---|---|---|---|---|
| Example No. | 1.9 GHz | 2.45 GHz | 5.8 GHz | 19 GHz | 60 GHz |
| 1 | 82 | 86 | 83 | 87 | 93 |
| 15 | 82 | 86 | 84 | 87 | 94 |
| 16 | 81 | 85 | 85 | 86 | 91 |
| 17 | 82 | 86 | 84 | 86 | 92 |
| Comp. Ex. 2 | 65 | 80 | 85 | 72 | 76 |
| Comp. Ex. 3 | 84 | 86 | 73 | 72 | 90 |

What is claimed is:

1. An electromagnetic wave absorbing material which can absorb about 75 to 94% of electromagnetic waves over a frequency range of 1.9 to 60 GHz comprising:

a first layer composed of a conductive material having a shielding capacity of not less than 20 dB;

a second layer applied on the first layer, comprising particles of a metal oxide magnetic material and a matrix of a binder, the second layer having a thickness of from 1.8 to 3.6 mm, and the particles of the metal oxide magnetic material having a mean particle size of from 2 to 50 μm; and a third layer applied on the second layer, comprising particles of a metal magnetic material and a matrix of a binder, the third layer having a thickness of from 0.2 to 1.1 mm, and the particles of the metal magnetic material having a mean particle size of from 1 to 30 μm, wherein the metal magnetic material comprises 80 to 90% by weight of the third layer.

2. The electromagnetic wave absorbing material according to claim 1, wherein the conductive material is a metal plate, a metal mesh, a metal cloth, a conductive coated film or a metal deposited layer.

3. The electromagnetic wave absorbing material according to claim 1, wherein the metal oxide magnetic material is selected from the group consisting of Mn-Zn ferrite, Ni-Zn ferrite, Mn-Mg-Zn ferrite, Li ferrite, Mn-Cu-Zn ferrite, Ba ferrite and Sr ferrite.

4. The electromagnetic wave absorbing material according to claim 1, wherein the metal oxide magnetic material is selected from the group consisting of Mn-Zn ferrite, Ni-Zn ferrite and Mn-Mg-Zn ferrite.

5. The electromagnetic wave absorbing material according to claim 1, wherein the particles of the metal oxide magnetic material have a mean particle size of from 2 to 30 μm.

6. The electromagnetic wave absorbing material according to claim 1, wherein the metal oxide magnetic material comprises 85 to 92% by weight of the second layer.

7. The electromagnetic wave absorbing material according to claim 1, wherein the second layer has a thickness of from 2.2 to 3.2 mm.

8. The electromagnetic wave absorbing material according to claim 1, wherein the metal magnetic material is at least one magnetic metal or their alloy selected from the group consisting of Fe, Ni, Co, silicon steel, Sendust, Permalloy, amorphous metal, and iron magnetic alloys containing at least one metal element selected from the group consisting of Si, Al, Co, Ni, V, Sn, Zn, Pb, Mn, Mo and Ag.

9. The electromagnetic wave absorbing material according to claim 1, wherein the particles of the metal magnetic material have a mean particle size of from 2 to 20 μm.

10. The electromagnetic wave absorbing material according to claim 1, wherein the third layer has a thickness of from 0.3 to 0.8 mm.

* * * * *